United States Patent
Weale et al.

(10) Patent No.: US 7,286,174 B1
(45) Date of Patent: Oct. 23, 2007

(54) DUAL STORAGE NODE PIXEL FOR CMOS SENSOR

(75) Inventors: Gareth P. Weale, New Hamburg (CA); Charles R. Smith, Waterloo (CA); Eric C. Fox, Waterloo (CA); Douglas Dykaar, Waterloo (CA); Matthias Sonder, Kitchener (CA); Binqiao Li, Waterloo (CA)

(73) Assignee: DALSA, Inc., Waterloo (CA)

( * ) Notice: Subject to any disclaimer, the term of this patent is extended or adjusted under 35 U.S.C. 154(b) by 781 days.

(21) Appl. No.: 10/162,107

(22) Filed: Jun. 5, 2002

Related U.S. Application Data

(60) Provisional application No. 60/295,554, filed on Jun. 5, 2001.

(51) Int. Cl.
*H04N 3/14* (2006.01)
*H04N 5/335* (2006.01)
*H01N 31/062* (2006.01)
*H01N 31/113* (2006.01)

(52) U.S. Cl. .................... 348/308; 257/293; 250/208.1
(58) Field of Classification Search ................ 348/300, 348/308; 257/291, 293
See application file for complete search history.

(56) References Cited

U.S. PATENT DOCUMENTS

| | | | |
|---|---|---|---|
| 4,145,721 A | 3/1979 | Beaudouin et al. | |
| 5,162,912 A | 11/1992 | Ueno et al. | |
| 5,585,652 A | 12/1996 | Kamasz et al. | |
| 5,698,844 A | 12/1997 | Shinohara et al. | |
| 5,771,070 A | 6/1998 | Ohzu et al. | |
| 5,793,423 A * | 8/1998 | Hamasaki | 348/302 |
| 5,998,779 A | 12/1999 | Kozuka | |
| 6,067,113 A | 5/2000 | Hurwitz et al. | |
| 6,101,232 A | 8/2000 | Fossum et al. | |
| 6,118,115 A | 9/2000 | Kozuka et al. | |
| 6,130,712 A | 10/2000 | Miyazaki et al. | |
| 6,201,572 B1 | 3/2001 | Chou | |
| 6,317,154 B2 * | 11/2001 | Beiley | 348/308 |
| 6,501,506 B1 * | 12/2002 | Miura | 348/308 |
| 6,529,241 B1 * | 3/2003 | Clark | 348/308 |
| 6,606,120 B1 * | 8/2003 | Merrill et al. | 348/273 |
| 6,831,685 B1 * | 12/2004 | Ueno et al. | 348/243 |

OTHER PUBLICATIONS

Brown, Chappell, CMOS pixel sensor targets consumer market, Jan. 9, 2001, EE Times, www.eetimes.com/showArticle.jhtml?articleID=18305338.*

Ma, Shyh-Yih and Chen, Liang-Gee, "A Single-Chip CMOS APS Camera with Direct Frame Difference Output", IEEE Journal of Solid-State Circuits, vol. 34, No. 10, Oct. 1999.

* cited by examiner

*Primary Examiner*—Ngoc-Yen Vu
*Assistant Examiner*—Adam L. Henderson
(74) *Attorney, Agent, or Firm*—Fisher Technology Law PLLC

(57) ABSTRACT

A sensor includes control circuitry and a pixel. The pixel includes a photo site, a first storage node and a second storage node. The control circuitry causes the pixel to transfer a first collected signal from the photo site to the first storage node during a first period, to transfer a second collected signal from the photo site to the second storage node during a second period that follows the first period, and to transfer the first and second collected signals out of the pixel during a third period that follows the second period.

4 Claims, 12 Drawing Sheets

DUAL STORAGE NODE PIXEL FOR CMOS SENSOR

The priority benefit of the Jun. 5, 2001 filing date of provisional application 60/295,554 is hereby claimed.

BACKGROUND OF THE INVENTION

1. Field of the Invention

The present invention relates to a dual storage node pixel for a CMOS sensor. In particular, the invention relates to use of the two storage nodes for subtraction of background illumination.

2. Description of Related Art

In a conventional CMOS imager, a photo generated signal in a pixel is integrated for a period of time and then subsequently read out. Generally, in some sensors, a single frame (an array of pixels) is collected and then read out before the collection of the subsequent frame. Also, in other sensors, a single frame (an array of pixels) is collected during an integration period that overlaps a period where the previously collected frame of pixels is being read out. There may be some disadvantages that arise from the time delay between collecting two frames of data.

For example, for smart air bag deployment, at the moment of a crash, a decision must be made whether to deploy an airbag and, if so, with what force. This decision must be made in <10 ms with unknown and changing scene lighting. To capture an image with varying light conditions, a standard CMOS image sensor requires one exposure with a pulsed light emitting diode (LED) source, one frame readout, a second exposure without the LED, a second frame readout, and finally off-chip subtraction to form a difference image, the difference image being the illuminated image with the background illumination subtracted out. Any change in lighting during the 1 millisecond or more interval between exposures creates image artifacts disrupting pattern recognition.

For example, in a 40 mile per hour crash where the occupant continues to move at 40 miles per hour relative to a car frame mounted camera, a 1 millisecond image delay represents an occupant movement of over 17 millimeters. On the other hand, if the time interval between the two images were to be reduced to 10 microsecond, the movement would be less than 0.18 millimeters.

Shyh-Yih Ma and Liang-Gee Chen, describe a basic charge transfer pixel but without most of the architectural and clocking improvements described in this improvement. See Shyh-Yih Ma and Liang-Gee Chen, *A Single-Chip CMOS APS Camera with Direct Frame Difference Output*, IEEE J. Solid State Circuits, vol. 34, no. 10, pp. 1415-1418, 1999. Stacy Kamasz, et al., describe a dual node CCD pixel in U.S. Pat. No. 5,585,652, titled *Method and Apparatus for Real-Time Background Illumination Subtraction*.

SUMMARY OF THE INVENTION

It is an object to the present invention to overcome limitation of the prior art. This and other objects are achieved in a sensor that includes control circuitry and a pixel. The pixel includes a photo site, a first storage node and a second storage node. The control circuitry causes the pixel to transfer a first collected signal from the photo site to the first storage node during a first period, to transfer a second collected signal from the photo site to the second storage node during a second period that follows the first period, and to transfer the first and second collected signals out of the pixel during a third period that follows the second period.

BRIEF DESCRIPTION OF DRAWINGS

The invention will be described in detail in the following description of preferred embodiments with reference to the following figures wherein:

FIGS. 7-11 are schematic diagrams of alternative embodiments of a pixel according to the present invention.

DETAILED DESCRIPTION OF PREFERRED EMBODIMENTS

It is advantageous, in many applications, to collect and store two or more frames worth of data and then subsequently read these frames out at a subsequent point in time. One example of such an application is the imaging of a scene illuminated by a strobed light source (e.g. laser diode) that is relatively weak in comparison to a strong background illumination (e.g. sunlight in an outdoor scene). With a dual node pixel one scene is collected and stored during a period of duration T during which the strobed source is turned on so that the collected light includes the scene illumination provided by the strobed source plus the strong background source. The signal is then stored on storage site #1. The second scene is subsequently collected during another period of duration T during which the strobed source is turned off so that the collected light includes only the scene illumination provided by the strong background. The signal is then stored on storage site #2. Subsequently, the two sites are read out and subtracted from each other producing a difference signal that corresponds to the scene as illuminated only by the strobed source.

A dual node pixel of the present invention is applied in order to compensate for performance limitations in a conventional pixel. For example, a conventional CMOS pixel for synchronous imaging contains a distinct photosite and storage/sense node—during the integration period charge is collected in the photosite of each pixel for a small fraction of the frame time and then the signal in each photosite is transferred to the corresponding storage/sense node for subsequent read out. However during the read out period there can be significant crosstalk from the photosite into the storage node (i.e., a small fraction of the signal generated by light falling on the photosite, all of which ideally is to be ignored, ends up producing charge in the storage nodes) "contaminating" the snap shot image stored on those sites. For very short exposures only a small amount of signal charge is collected—however during the much longer readout a considerable amount of crosstalk signal can accumulate, even if only a small percentage of the light falling on the sensor during the read out ends up in the storage sites. With a dual node pixel, the signal collected during the integration period is stored on one of the storage sites while nothing is explicitly stored on the second storage site. However during the long read out phase both storage sites should collect equal amounts of signal due to crosstalk. If both sites are read out and differenced then all that should be left is the desired signal from the short exposure time.

In yet another application, motion is detected and measured by differencing two closely spaced exposures. One can generate an output signal that is non-zero only for the parts of the scene that changed between the two exposures.

Figure 1:
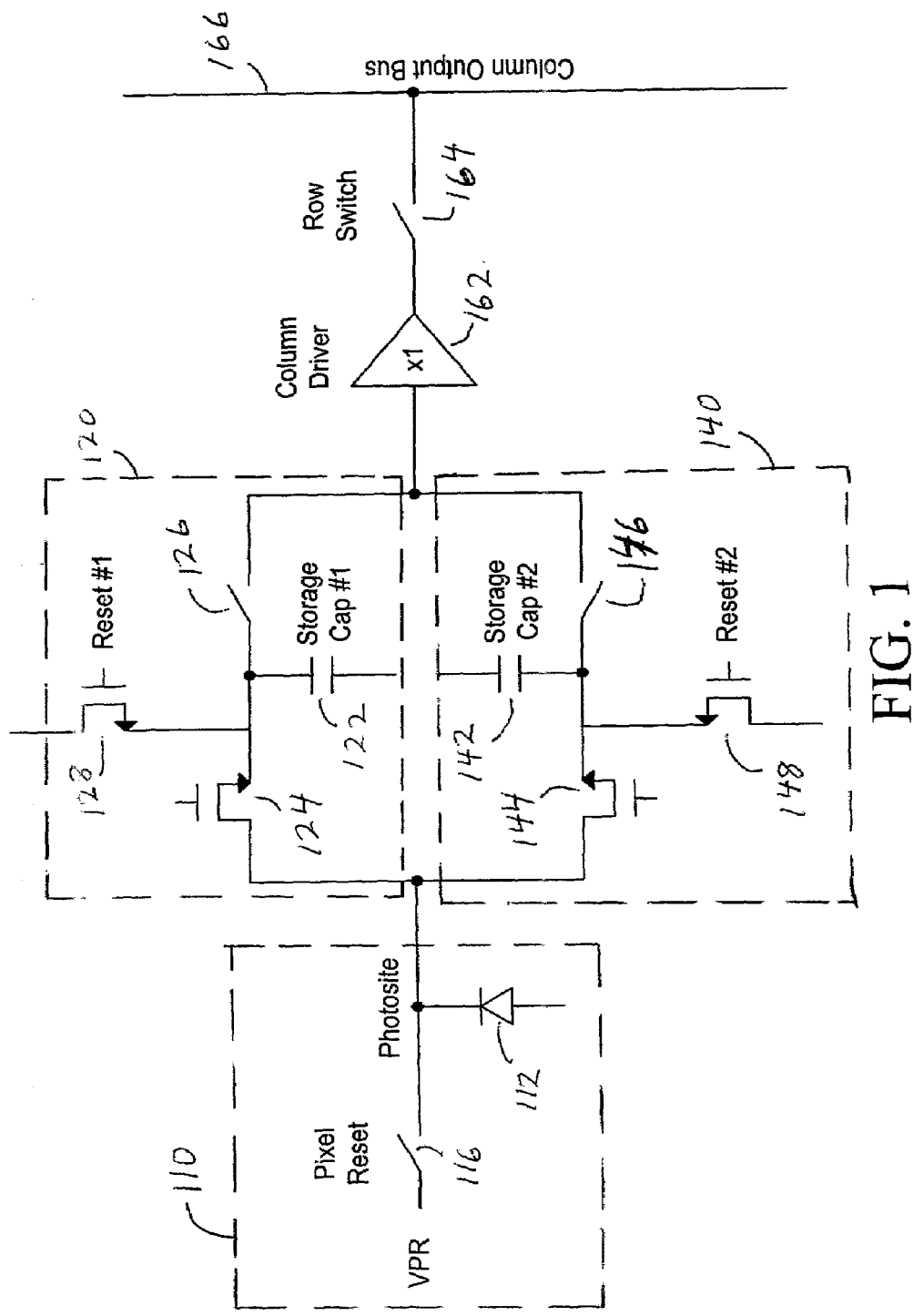
FIG. 1 is a schematic diagram of a charge transfer embodiment of the present invention.

Two different embodiments for a dual node pixel are described representing a charge transfer architecture and a voltage transfer architecture. The first requires that the signal charge be transferred from the photosite to two storage capacitors as illustrated in FIG. 1. The charge is transferred across two distinct transfer gates. The storage capacitors also function as sense nodes allowing the signal to be transferred from the charge domain to the voltage domain for readout. On readout, the voltage on storage capacitor #1 is first buffered and put onto the column data bus to be read off-array. Then, the capacitor is reset and read once more to affect correlated double sampling. Off array the two levels are differenced to produce a signal level for capacitor #1 that has the FPN (fixed pattern noise) from the readout chain eliminated. The same series of operations is applied to capacitor #2. Then off-array the two signals from the two capacitors are subtracted. A similar but more basic architecture was described by Ma and Chen in 1999, though we are suggesting several improvements to the architecture that they presented.

If there is only a single common output buffer for the pixel, then the second read of each storage node after they have been reset to remove offsets (e.g., for the purpose of correlated double or difference sampling), is not strictly necessary. This is because the signals from each of the two storage nodes will be differenced anyway. Any offset errors in the single output buffer will be common to the readout of each of the dual nodes. The error will be subtracted when the final difference is achieved. However, there could still be an advantage to the double sampled read out sequence described. For example, an advantage would be to subtract offsets induced by differences in the parasitic feed through from the clock signals applied to switches 126 and 146 (parasitic feed through from the clocks applied to those switches through to the source/drains).

Figure 2:
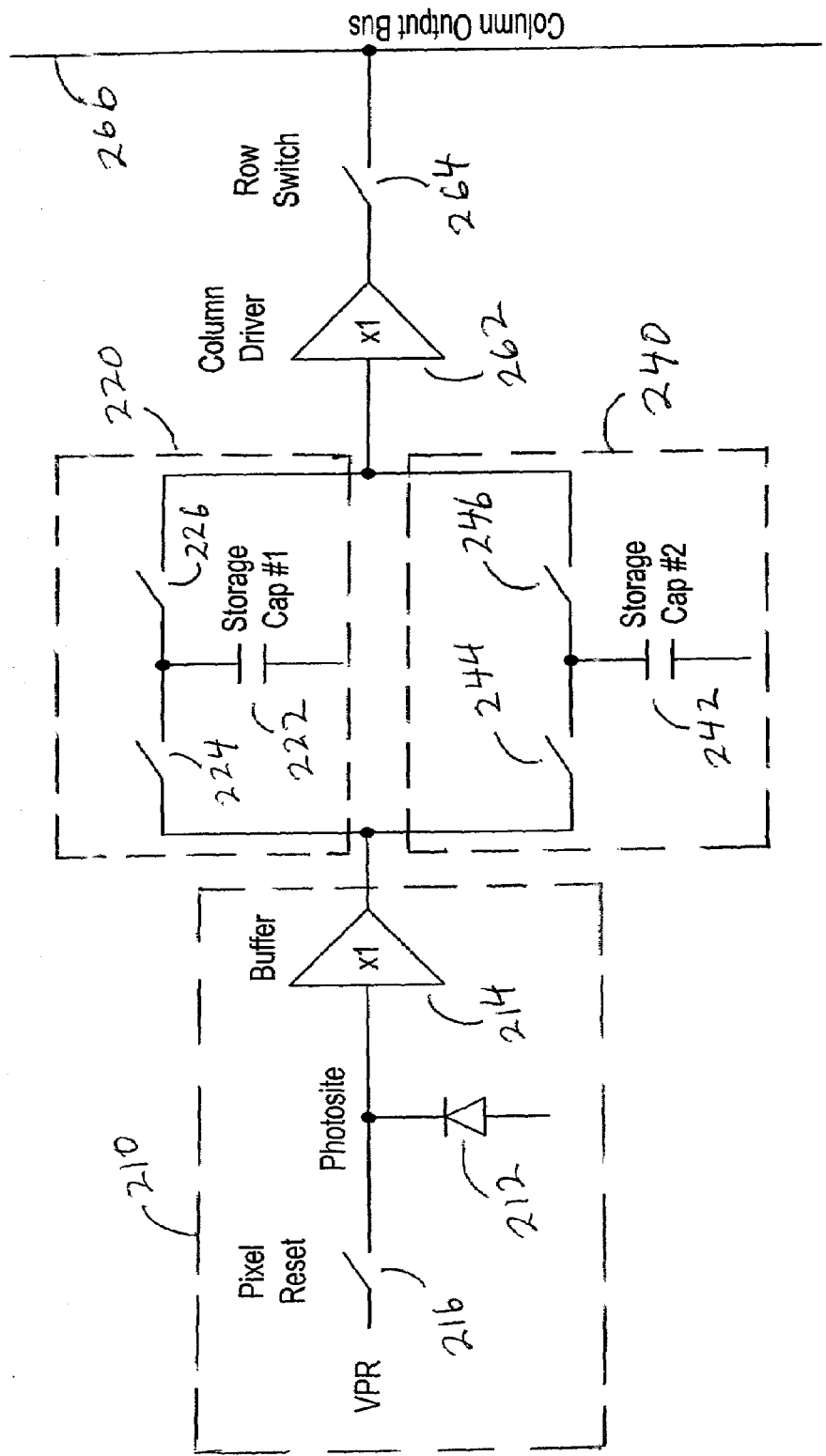
FIG. 2 is a schematic diagram of a voltage transfer embodiment of the present invention.

In a first embodiment of the invention, a sensor includes control circuitry and a pixel having a photo site (110 of FIG. 1, 210 of FIG. 2), a first storage node (120 of FIG. 1, 220 of FIG. 2) and a second storage node (140 of FIG. 1, 240 of FIG. 2). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period.

FIG. 1 illustrates the charge transfer architecture. Signal charge is transferred from the photosite across two separate transfer gates to two separate storage capacitors. In another embodiment of the invention, in the sensor described above, the photo site (110) includes a photo detector (112) where the photo detector is either a photodiode or a pinned photodiode. The first and second collected signals are charge type signals where the signal value is encoded by the number of charge units regardless of the potential that represents. Most sensors collected photo electrons as the charge units; although, hole might be collected.

In yet another embodiment of the invention, in the sensor described above, the first storage node (120) includes a first charge holding capacitor (122) and a first charge transfer gate (124) coupled between the first charge holding capacitor and the photo detector. The second storage node (140) includes a second charge holding capacitor (142) and a second charge transfer gate (144) coupled between the second charge holding capacitor and the photo detector. A charge holding capacitor should be understood to be a capacitor that holds a signal defined by the charge held, in contrast to the voltage. Persons of ordinary skill in the art in light of these teachings will appreciate that the voltage on the capacitor is computed from a ratio of the charge held on the capacitor divided by the capacitance. Suitable capacitors for this application include reverse biased diodes.

In yet another embodiment of the invention, in the sensor described above, the pixel further includes an output buffer (162), and the first storage node further includes an output voltage switch (126) coupled between the first charge holding capacitor and the output buffer. The second storage node further includes an output voltage switch (146) coupled between the second charge holding capacitor and the output buffer. A preferred voltage switch for this application includes a transistor with a switching signal applied to the gate electrode with sufficient potential to totally turn on and turn off conduction through the transistor for all signal voltages in the range expected for signals stored on the node's capacitor.

In another embodiment of the invention, in the sensor described above as a first embodiment, the photo site (110) includes a photo detector (112) where the photo detector is either a photodiode or a pinned photodiode. The first and second collected signals are charge type signals where the signal value is encoded by the number of charge units regardless of the potential that represents. Most sensors collected photo electrons as the charge units; although, hole might be collected. In this embodiment, the pixel further includes an output buffer (162), and the first storage node includes a first charge holding capacitor (122) and an output voltage switch (126) coupled between the first charge holding capacitor and the output buffer. The second storage node includes a second charge holding capacitor (142) and an output voltage switch (146) coupled between the second charge holding capacitor and the output buffer.

In a second basic architecture, a voltage transfer architecture, the signal is transferred from the charge domain to the voltage domain within the photosite. The photosite acts as a collection site for photo generated electrons and as a sense node with a characteristic capacitance through which the signal charges are converted to a voltage. The signal voltage is buffered before driving two distinct sample-and-hold capacitors as illustrated in FIG. 2.

FIG. 2 illustrates the buffered photosite architecture. Signal charge is converted to a voltage on the photosite which is then buffered and directed onto one of two sample-and-hold capacitors. In a second embodiment of the invention, a sensor includes control circuitry and a pixel having a photo site (210 of FIG. 2), a first storage node (220 of FIG. 2) and a second storage node (240 of FIG. 2). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (210) includes a photo detector (212) and an input buffer (214) where the photo detector is either a photodiode or a pinned photodiode. The first and second collected signals are voltage type signals where the signal value is encoded as the voltage provided at the output of the photo site (210). Actually, the voltage at the output of the input buffer (214) is based on the conversion of charge to voltage on the capacitance of the sense node and adjusted for any voltage gain in the input buffer.

In another embodiment of the invention with voltage sample holding capacitors, in the sensor described above as a second embodiment, the first storage node (220) includes a first voltage sample holding capacitor (222) and an input voltage switch (224) coupled between the input buffer and the first voltage sample holding capacitor. The second storage node (240) includes a second voltage sample holding capacitor (242) and an input voltage switch (244) coupled between the input buffer and the second voltage sample holding capacitor. The voltage switches are as previously described. The voltage sample holding capacitor is a capacitance, as described below, that holds a signal value encoded as a voltage, and the capacitor operates over a sufficient voltage range to store the range of expected signal values.

In another variant of the second embodiment of the invention with an output buffer, in the sensor described above as a second embodiment, the pixel further includes an output buffer (262), and the first storage node (220) includes a first voltage sample holding capacitor (222), an input voltage switch (224) coupled between the input buffer and the first voltage sample holding capacitor, and an output voltage switch (226) coupled between the first voltage sample holding capacitor and the output buffer. The second storage node (240) includes a second voltage sample holding capacitor (242), an input voltage switch (244) coupled between the input buffer and the second voltage sample holding capacitor, and an output voltage switch (246) coupled between the second voltage sample holding capacitor and the output buffer. The voltage switches are as previously described. The voltage sample holding capacitor is a capacitance, as operates over a sufficient voltage range to store the range of expected signal values.

In another embodiment of the invention, in the sensor described above as a second embodiment, the pixel further includes an output buffer (262), and the first storage node includes a first voltage sample holding capacitor (222) and an output voltage switch (226) coupled between the first voltage sample holding capacitor and the output buffer. The second storage node includes a second voltage sample holding capacitor (242) and an output voltage switch (246) coupled between the second voltage sample holding capacitor and the output buffer.

The buffered scheme avoids having to transfer charge, something that is difficult to do with low noise and low lag in CMOS processes without PPD photosites. This architecture also eliminates the need for a reset of the storage nodes. However, buffered architectures do require an additional level of buffering in the pixel which consumes power, real estate on a chip in a monolithic semiconductor wafer, and reduces the maximum available signal swing range in the photo site due to the extra VT drop across the photo site buffer. There is also more read noise due to additional buffer amplifier.

In a charge transfer architecture, when a conventional diode is used to produce the photosite, then charge transfer is incomplete. This leads to image lag and to FPN (fixed pattern noise) due to transistor threshold VT variations between the two different transfer gates. One solution is to implement the photosite as a pinned photodiode (PPD) which allows the photosite to be fully depleted during charge transfer thereby eliminating lag and eliminating sensitivity to VT variations.

Another solution is to arrange the biasing/clocking in such a way as to share charge between the photosite and the storage capacitor during integration. This is accomplished by maintaining the transfer gate at a high level during the integration so that the incoming charge is shared between the photosite capacitor and storage capacitor to produce a common voltage level. At the end of integration, the transfer gate is clocked to its low level to isolate the photosite and storage capacitors. The charge sharing scheme works well if the photosite can be separately pre-reset to a known voltage level before integration begins.

In another embodiment of the invention, a sensor includes control circuitry and a pixel having a photo site (110 of FIG. 1), a first storage node (120 of FIG. 1) and a second storage node (140 of FIG. 1). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (110) includes a photo detector (112) where the photo detector is either a photodiode or a pinned photodiode. The first and second collected signals are charge type signals where the signal value is encoded by the number of charge units regardless of the potential that represents. The first storage node (120) includes a first charge holding capacitor (122) and a first charge transfer gate (124) coupled between the first charge holding capacitor and the photo detector. The second storage node (140) includes a second charge holding capacitor (142) and a second charge transfer gate (144) coupled between the second charge holding capacitor and the photo detector. The control circuitry is coupled to the first charge transfer gate (124) to provide a first control signal that can enable charges to freely transfer between the photo detector (112) and the first charge holding capacitor (122) throughout the first period, and the control circuitry is also coupled to the second charge transfer gate (144) to provide a second control signal that can enable charges to freely transfer between the photo detector (112) and the second charge holding capacitor (142) throughout the second period.

For anti-blooming and exposure control functionality, the pixel in FIG. 1 includes a separate gate, off of the photo site, that allows the photo site to be reset or preset. This switch does not otherwise need to be included since the photo site does not have to be explicitly reset. It is implicitly reset by virtue of the charge transfer operation. However, if a photo site preset gate is provided, then one can allow for anti-blooming (AB) during a frame read. A storage capacity of the photo detector (photodiode or PPD) might be sized for complete filling with photo charge without blooming by a short exposure with intense light during an exposure interval. However, were the same intensity of light to fall on the photo detector during a longer readout time the photo generated charges would otherwise fill the photo site and spill into the storage nodes thereby corrupting the stored charge packet during the frame readout. The gate also allows the photo site to be reset directly before the start of an integration period rather than indirectly by clocking the transfer gate (often referred to as the TCK gate) while the storage node reset gate is active. The gate also allows the photo site to be 'hard reset' (VPR set to a lower voltage than the high level on the reset switch minus a VT) in order to eliminate image lag for a photo site constructed with a conventional diode that cannot be fully depleted. Note though that the 'hard' reset can also be accomplished via other reset gates in the pixel that will be discussed next if having a non-overlap between the integration period and readout period for the previous frame can be tolerated. Note that VPR can be set to VDD in order to save a bus line. This eliminates the option of doing a hard reset on the photosite, but it still allows for exposure control and anti-blooming.

In another basic charge transfer embodiment of the invention with preset gate, a sensor includes control circuitry and a pixel having a photo site (110 of FIG. 1), a first storage node (120 of FIG. 1) and a second storage node (140 of FIG. 1). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (110) includes a photo detector (112) where the photo detector is either a photodiode or a pinned photodiode. The first and second collected signals are charge type signals where the signal value is encoded by the number of charge units regardless of the potential that represents. The photo site (110) further includes a preset gate (116) coupled to the photo detector (112), and the control circuitry is coupled to the preset gate to provide the preset gate with a preset signal (VPR).

In another embodiment of the invention, in the sensor described above in the basic charge transfer embodiment of the invention with preset gate, the control circuitry is coupled to the preset gate (116) to provide a preset gate control signal to a gate electrode of the preset gate, and the control circuitry controls a potential of the preset signal to be less than a potential of the preset gate control signal minus a transistor threshold voltage VT, at least for a moment to achieve a hard reset. This provides a basic hard reset capability. In a variant, the potential of the preset gate control signal differs from the potential of the preset signal by the transistor threshold voltage.

In another embodiment of the invention, in the sensor described above in the basic charge transfer embodiment of the invention with preset gate, the control circuitry is coupled to the preset gate to provide the preset gate with a preset signal (VPR) at a potential that operates as a drain, and the control circuitry is coupled to the preset gate (116) to provide a preset gate control signal at a potential that enables the preset gate to transfer a quantity of charge into the preset signal when accumulated charges in the photo detector (112) exceed a capacity of the photo detector to hold charge. This provides a basic anti-blooming function since charge in excess of the photo detector's capacity to hold charge with be shunted and drained away by the preset signal VPR. The photo detector is a photo diode or pinned photo diode characterized by a capacitance that is primarily defined by the diode area and dopant concentration. When the diode is reset, the diode "capacitance" is charged positively relative to the substrate. The capacity to hold photo electrons is substantially defined by the number of photo electrons that would change the potential in the diode to be substantially equal to the potential of the substrate (or other adjacent or near by region that might be subject to cross contamination).

In another embodiment of the invention, in the sensor described above in the basic charge transfer embodiment of the invention with preset gate, the control circuitry is coupled to the preset gate to provide the preset gate with the preset signal (VPR) at a potential that operates as a drain, and the control circuitry is also coupled to gate electrode of the preset gate (116) to provide a preset gate control signal. The control circuitry provides the preset gate control signal during a first portion of the first period at a first potential that enables the preset gate to transfer substantially all photo generated charge into the preset signal (thus acting like a shutter by preventing the accumulation of photo charge), and the control circuitry provides the preset gate control signal during a second portion of the first period at a second potential that enables the preset gate to transfer a quantity of charge into the preset signal when accumulated charges in the photo detector (112) exceed a capacity of the photo detector to hold charge (thus performing an anti-blooming function).

In another basic voltage transfer embodiment of the invention with preset gate, a sensor includes control circuitry and a pixel having a photo site (210 of FIG. 2), a first storage node (220 of FIG. 2) and a second storage node (240 of FIG. 2). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (210) includes a photo detector (212) where the photo detector is either a photodiode or a pinned photodiode. The first and second collected signals are voltage type signals where the signal value is encoded in the voltage regardless of the number of charge units that represents on a particular capacitor. The photo site (210) further includes a preset gate (216) coupled to the photo detector (212), and the control circuitry is coupled to the preset gate to provide the preset gate with a preset signal (VPR).

In another embodiment of the invention, in the sensor described above in the basic voltage transfer embodiment of the invention with preset gate, the photo detector (212) is a photodiode, the control circuitry is coupled to a gate electrode of the preset gate (216) to provide a preset gate control signal, and the control circuitry controls a potential of the preset signal to be less than a potential of the preset gate control signal minus a transistor threshold voltage VT, at least for a moment to achieve a hard reset. This provides a basic hard reset capability. In a variant, the potential of the preset gate control signal differs from the potential of the preset signal by the transistor threshold voltage. In a variant, the potential of the preset gate control signal differs from the potential of the preset signal by the transistor threshold voltage.

In another embodiment of the invention, in the sensor described above in the basic voltage transfer embodiment of the invention with preset gate, the control circuitry is coupled to the preset gate to provide the preset gate with a preset signal (VPR) at a potential that operates as a drain, and the control circuitry is coupled to the preset gate (216) to provide a preset gate control signal at a potential that enables the preset gate to transfer a quantity of charge into the preset signal when accumulated charges in the photo detector (212) exceed a capacity of the photo detector to hold charge (thus performing an anti-blooming function).

In another embodiment of the invention in the sensor described above in the basic voltage transfer embodiment of the invention with preset gate, the control circuitry is coupled to the preset gate to provide the preset gate with a preset signal (VPR) at a potential that operates as a drain, and the control circuitry is coupled to a gate electrode of the preset gate (216) to provide a preset gate control signal. The control circuitry provides the preset gate control signal during a first portion of the first period at a first potential that enables the preset gate to transfer substantially all photo generated charge into the preset signal (thus acting like a shutter by preventing the accumulation of photo charge); and the control circuitry provides the preset gate control signal during a second portion of the first period at a second potential that enables the preset gate to transfer a quantity of charge into the preset signal when accumulated charges in the photo detector (212) exceed a capacity of the photo detector to hold charge (thus performing an anti-blooming function).

Figure 3:
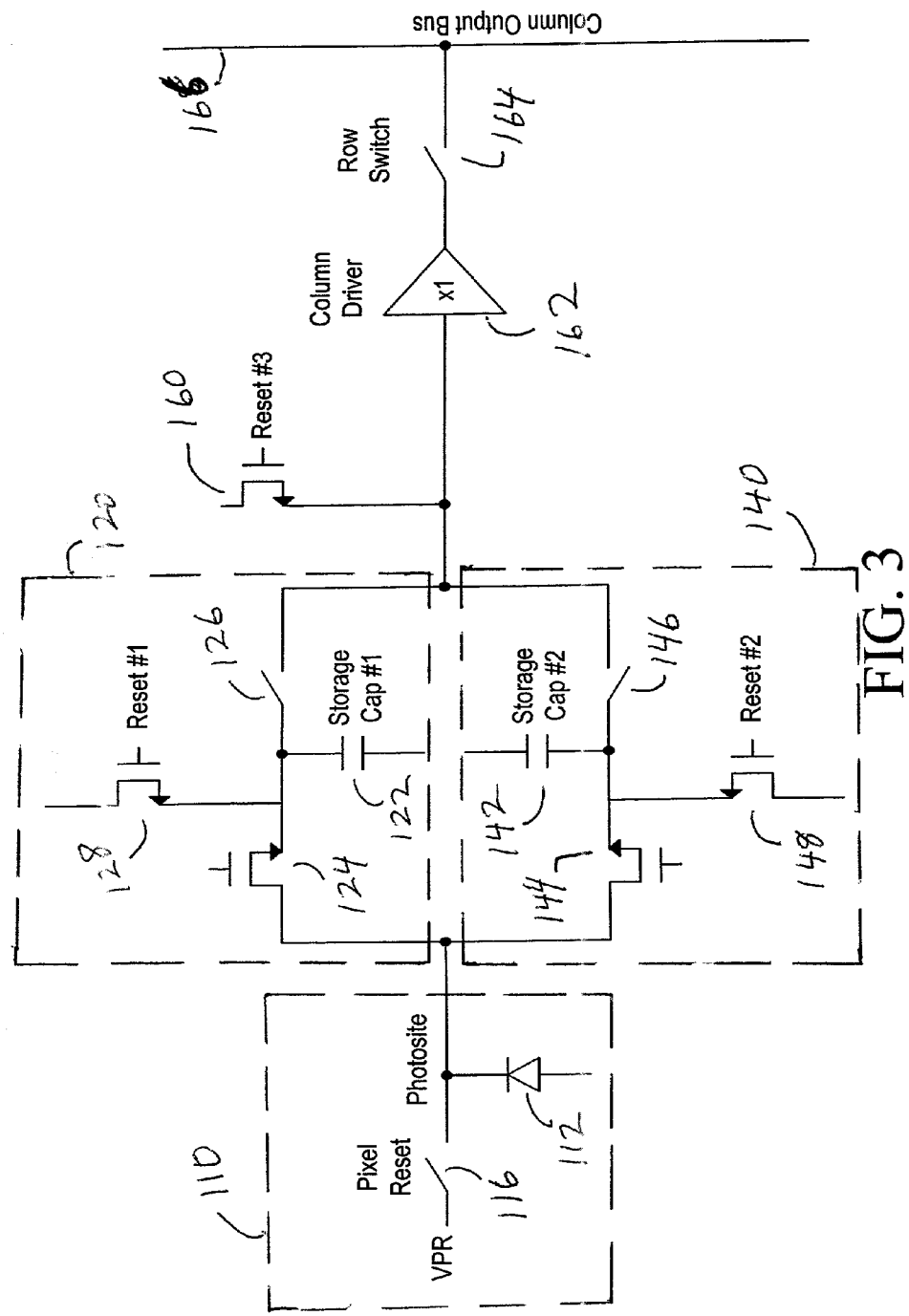
FIGS. 3-6 are schematic diagrams of alternative embodiments of the present invention involving reset circuitry and single and dual output buffer circuitry.

For storage node reset, the pixel circuitry must allow for the resetting of the storage nodes before charge is transferred from the photosite. It should also allow for the resetting of the parasitic load capacitance of the input to the buffer that drives the column data line. Several options for the location of the reset switch are illustrated in FIG. 3. In general, not all of these will be included in a given pixel design.

FIG. 3 illustrates possible locations for the reset switches for the photosite/storage mode/buffer input. Storage node reset can be accomplished separately by Reset #1 and Reset #2. If it is acceptable to reset both nodes at the same time (more on this in section on FPN reduction) then the same clock can be applied to Reset #1 and Reset #2 in order to save a bus line. Ideally, the biases applied to the drains of the reset switches are arranged so that there is a 'hard' reset of the relevant nodes in order to eliminate lag and to eliminate sensitivity to variations in the VT beneath of the relevant reset FET's.

In another basic charge transfer embodiment of the invention with reset gates for the nodes, a sensor includes control circuitry and a pixel having a photo site (110 of FIG. 1), a first storage node (120 of FIG. 1) and a second storage node (140 of FIG. 1). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (110) includes a photo detector (112) where the photo detector is either a photodiode or a pinned photodiode. The first and second collected signals are charge type signals where the signal value is encoded by the number of charge units regardless of the potential that represents. The first storage node (120) includes a first charge holding capacitor (122), a first charge transfer gate (124) coupled between the first charge holding capacitor and the photo detector, and a first reset gate (128) coupled to the first charge holding capacitor (122). The second storage node (140) includes a second charge holding capacitor (142), a second charge transfer gate (144) coupled between the second charge holding capacitor and the photo detector, and a second reset gate (148) coupled to the second charge holding capacitor (142). A charge holding capacitor should be understood to be a capacitor that holds a signal defined by the charge held, in contrast to the voltage.

In another embodiment of the invention, in the sensor described above in the basic charge transfer embodiment of the invention with reset gates for the nodes, the first reset gate (128) is coupled between the first charge holding capacitor (122) and a first reset signal. The control circuitry is coupled to the first reset gate (128) of the first storage node to provide a first reset gate control signal, and the control circuitry controls a potential of the first reset signal to be less than a potential of the first reset gate control signal minus a transistor threshold voltage VT. In a variant, the potential of the first reset gate control signal differs from the potential of the first reset signal by the transistor threshold voltage.

The input to the column buffer will have a non-zero parasitic capacitance which ideally should also be reset. This can be accomplished with Reset #3. Again, a hard reset is preferred. Ideally the reset level on the input to the column amplifier is identical to the reset levels on the storage nodes. Reset #3 can be eliminated, or the Resets #1 and/or #2 for the storage nodes can be eliminated if the reset operation is performed with the switches that connect the storage nodes to the buffer are turned on during the reset operation.

In another basic charge transfer embodiment of the invention with a reset gate at the output buffer, a sensor includes control circuitry and a pixel having a photo site (110 of FIG. 1), a first storage node (120 of FIG. 1), a second storage node (140 of FIG. 1), and an output buffer (162). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (110) includes a photo detector (112) where the photo detector is either a photodiode or a pinned photodiode. The first and second collected signals are charge type signals where the signal value is encoded by the number of charge units regardless of the potential that represents. The first storage node includes a first charge holding capacitor (122) and an output voltage switch (126) coupled between the first charge holding capacitor and the output buffer, and the second storage node includes a second charge holding capacitor (142) and an output voltage switch (146) coupled between the second charge holding capacitor and the output buffer. The sensor further includes a reset gate (160) coupled between an input of the output buffer (162) and a reset signal. The control circuitry is coupled to a gate electrode of the reset gate (160) to provide a reset gate control signal, and the control circuitry controls a potential of the reset signal to be less than a potential of the reset gate control signal minus a threshold voltage. This provides a hard reset function. In a variant, the potential of the reset gate control signal differs from the potential of the reset signal by a transistor threshold voltage VT.

In another embodiment of the invention, a sensor includes control circuitry and a pixel having a photo site (110 of FIG. 1), a first storage node (120 of FIG. 1) and a second storage node (140 of FIG. 1). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (110) includes a photo detector (112) where the photo detector is either a photodiode or a pinned photodiode. The first and second collected signals are charge type signals where the signal value is encoded by the number of charge units regardless of the potential that represents. The first storage node (120) includes a first charge holding capacitor (122) and a first charge transfer gate (124) coupled between the first charge holding capacitor and the photo detector. The second storage node (140) includes a second charge holding capacitor (142) and a second charge transfer gate (144)

coupled between the second charge holding capacitor and the photo detector. The sensor further includes a first output buffer (162) coupled to the first charge holding capacitor (122), a first row switch (164) coupled between the first output buffer and a first column bus (166), a second output buffer (172) coupled to the second charge holding capacitor (142), and a second row switch (174) coupled between the second output buffer and a second column bus (176).

In another basic voltage transfer embodiment of the invention with dual output buffers, a sensor includes control circuitry and a pixel having a photo site (210 of FIG. 2), a first storage node (220 of FIG. 2) and a second storage node (240 of FIG. 2). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (210) includes a photo detector (212) where the photo detector is either a photodiode or a pinned photodiode. The first and second collected signals are voltage type signals where the signal value is encoded in the voltage regardless of the number of charge units that represents on a particular capacitor. The first storage node (220) includes a first voltage sample holding capacitor (222) and an input voltage switch (224) coupled between the input buffer and the first voltage sample holding capacitor, and the second storage node (240) includes a second voltage sample holding capacitor (242) and an input voltage switch (244) coupled between the input buffer and the second voltage sample holding capacitor. The sensor further includes a first output buffer (262) coupled to the first voltage sample holding capacitor (222), a first row switch (264) coupled between the first output buffer and a first column bus (266), a second output buffer (272) coupled to the second voltage sample holding capacitor (242), and a second row switch (274) coupled between the second output buffer and a second column bus (276).

These Reset #1 and/or #2 and/or #3 can even be used to do a hard reset of the photosite as long as the biases and switches are clocked so that the reset level on the photosite is lower than the reset levels on the storage nodes (need to be able to subsequently transfer charge out of the photosite). In this case the photosite reset operation has to occur after the previous frame has been read out which means that integration cannot occur in parallel with the readout of the previously captured frame. It also means that there can be no antiblooming during readout. This reset would be performed by clocking the bias on the drain of Reset #1, #2, or #3 to a low level with all switches and transfer gates on to hard reset the photosite to a low voltage. The bias on the drain would then be clocked high causing the photosite to spill excess charge to the channel potential beneath each of the transfer gates (also thereby eliminating sensitivity to VT differences on the two gates).

All storage node resetting can equivalently be done by VPR and the photosite reset switch, but again the photosite reset operation has to occur after the previous frame has been read out which means that integration cannot occur in parallel with the readout of the previously captured frame. In that case the photosite transfer gates need to have 3 clock levels. During the storage node resets these gates are clocked to their highest levels and VPR is kept at a high voltage. Subsequently, the transfer gates are clocked to a medium level at which they sit during a photosite transfer thereby resetting the photosite. Following the reset the transfer gates are clocked to a low level to allow for integration.

As noted above, the photosite does not need to be explicitly reset in order to operate. The photosite is implicitly reset every time charge is transferred across one of the TCK gates (transfer gates). Generally the photosite will need to be reset, explicitly or implicitly, before the start of integration in order to provide a known starting point. If the photosite is a PPD, then the most straightforward reset method is not via the TCK gates, but rather via the antiblooming gate on the photosite.

If the photosite is implemented as a conventional photodiode, then the preferred reset method is as follows. First the AB gate is pulsed in such a way as to hard reset the photosite. Then, the TCK1 gate is pulsed to reset the photosite to the level of the transfer gate. Then, the integration is performed. After integration, the charge is transferred via TCK1 to storage node #1. The photosite is again hard reset via the AB gate, then soft reset across the TCK2 gate, then the second integration takes place, then the accumulated charge is transferred to the storage node #2. This reset sequence eliminates image lag in the photosite (hard reset), and also eliminates both fat zero noise and sensitivity to VT mismatch between the two TCK gates in the pixel.

To soft reset the photosite across a preset gate, the voltage VPR is set to a positive drain voltage to draw photo electrons, and a preset gate control signal applied to the gate electrode of the preset gate is set to a preset voltage. Photoelectrons are drawn across the preset gate toward the voltage VPR until the voltage on the photo detector is a voltage threshold VT below the voltage of the preset gate control signal, the preset voltage. Unfortunately, the final photo detector voltage is actually a function of not only the gate's VT, but also the initial charge in the photo detector and the duration of the transfer leading to image lag.

(VPR set to a lower voltage than the high level on the reset switch minus a VT)

A hard reset procedure eliminates some of the uncertainty of the soft reset procedure. To hard reset the photo site across a preset gate, the preset voltage VPR is set to a first voltage level desired for the photo detector at a beginning of the integration cycle, and a preset gate control signal is applied to the gate electrode of the preset gate is set to a more positive voltage (e.g., than the preset voltage) to allow electrons from VPR to transfer into the photo detector. When the preset signal VPR is later switched to a more positive voltage level, electrons no longer transfer across the preset gate into the photo detector. However, photo electrons are generated during the integration cycle to make the potential on the photo detector more negative according to the amount of light detected. If a soft reset were to immediately follow the hard reset, voltage VPR is switched to a more positive voltage to be used as a drain. Any excess electrons in the photo detector that cause the photo detector to be at a potential more negative than the preset gate control signal applied to the gate electrode of the preset gate (minus the transistor threshold voltage VT) are drained off into the preset signal VPR. In the soft reset step, the extra electrons transferred to the photo detector during a hard reset (that make the potential of the photo detector more negative than the preset gate control signal) are drained into the voltage VPR. The photo detector is left at a potential equal to the preset voltage minus VT regardless of whether any charge remains in the photo detector from a previous integration cycle, thus eliminating image lag.

The pixel can be configured with one or two data columns. With a single column the column is used at different times to output each of the two storage nodes. An advantage of this architecture is that the column buffer, column, and column amplifier can be common for the two nodes thereby eliminating mismatch issues.

Figure 4:
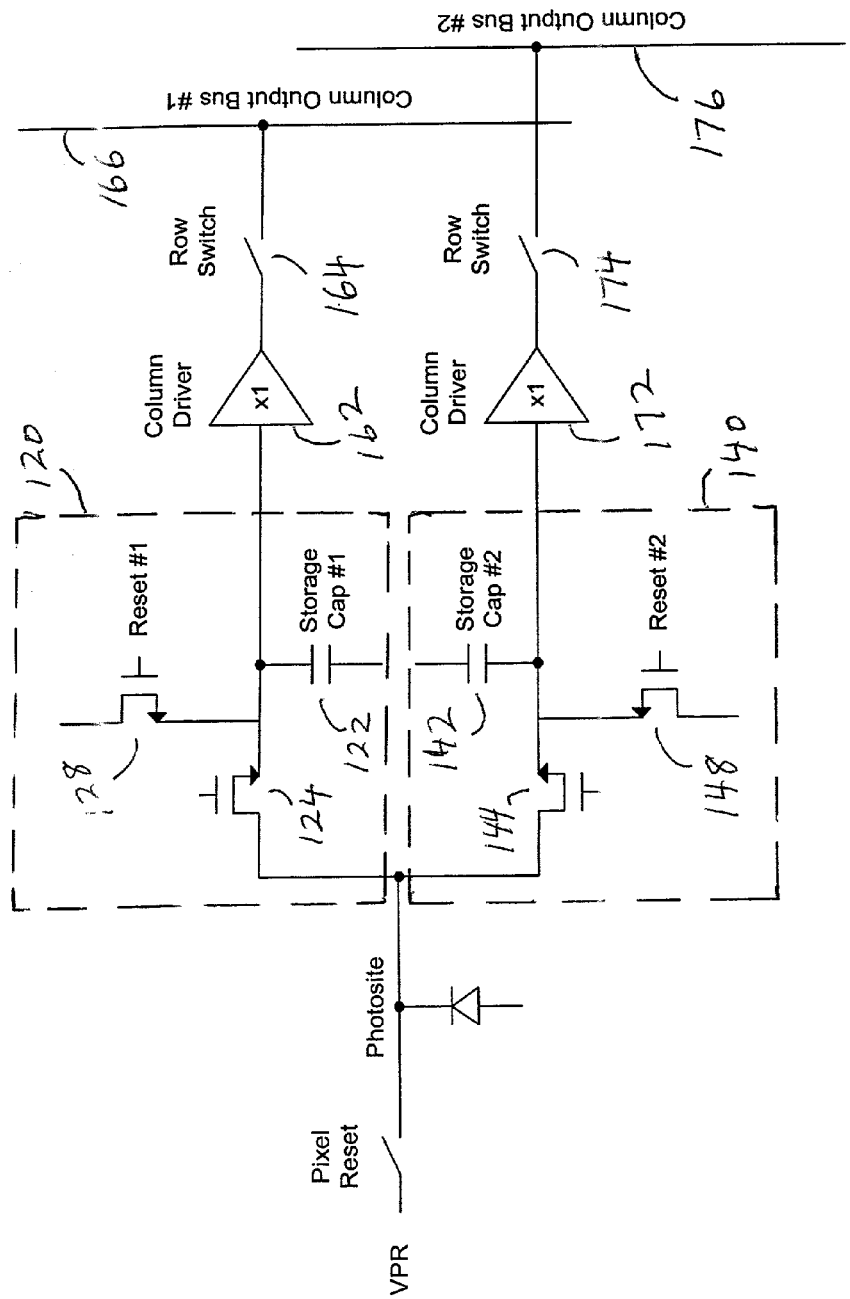

FIG. 4 illustrates a dual node pixel with two output data columns. A pixel with two data columns can be more appropriate for certain differencing amplifiers (in the illustrated pixels the differencing amps are located off-array). In this case the pixel will generally be configured with two identical column buffers as illustrated in FIG. 4. This architecture allows the two signals to be available at the same time for off-array processing (e.g. can be fed simultaneously into a difference amplifier). With the dual output there is no need to separately reset the node attached to the column buffer since there is no switch between the buffer input and the storage node.

As with conventional CMOS imager pixels, there will be fixed pattern noise (FPN) from pixel-to-pixel differences in the DC offset levels for the gates and amplifiers. In most conventional pixels this "noise" is reduced by double sampling whereby the signal level is put on the column and sampled, and then the pixel is reset and the operation is repeated. The output signal is the difference between these two samples. Ideally the same concepts will be applied to a dual node pixel.

Where the pixel is configured with a single data column and column buffer, then the differencing takes place when the two signal from the two nodes are differenced off-array. Any offset variations from pixel to pixel in the column buffer will be applied equally to the two signals.

When two separate data columns and two separate column buffers are used, then each of the nodes are sampled with the signals and then again after a reset. In particular, for each node read, the signal on the node would be put on the appropriate column bus, then the storage node would be reset, then that reset level would be buffered onto the data column. The difference between the signal and reset level eliminates any offset errors in the column buffers. The differencing does not eliminate mismatch errors between the TCK gates. A way to eliminate that type of error is via a PPD photosite (i.e., a photosite that can be fully depleted). However, an alternative way to remove mismatch between the transfer gates, as described elsewhere, has a penalty that the image integration can't begin until after the prior frame has been read out. For most applications, the PPD implementation is preferred.

The simplest pixel configuration is to implement all of the circuitry in NMOS or PMOS. However, there can be advantages to mixing both PMOS and NMOS within the same pixel. For example, if the reset gates #1, #2, and #3 in FIG. 3 are implemented in PMOS and the TCK gates and photosite preset gate are implemented in NMOS, then the storage sites can be reset to the most positive power rail thereby providing more potential swing for the column buffers (in this case would be implemented in NMOS), something that is attractive for low voltage processes. Persons of ordinary skill in the art will appreciate in light of these teachings that sensors that are implemented in NMOS technology (n type conductivity drains and sources formed in p type material) can be redesigned and implemented in PMOS technology (p type conductivity drains and sources formed in n type material) and vice versa. Mixing the two technologies provides additional advantages as discussed herein.

A drawback of the buffered photosite architecture (voltage transfer architecture) is voltage drops within the pixel due to the buffer will tend to reduce the range available for signal swings. If both the photosite buffer and the column driver are implemented as NMOS source-followers, then there will be at least two VT drops, one across the first buffer and the other across the second buffer. Those two drops can consume so much of the available rail-to-rail voltage as to leave an insufficiently small range for signal swing.

One solution is to implement the two in-pixel buffers in opposite polarity (e.g., the photosite buffer as an NMOS source-follower and the column buffer as a PMOS source-follower). The negative offset induced by the first buffer will be largely offset by the positive offset of the second buffer. Similarly, the reset FET on the photosite could be implemented in a different polarity in order to move the reset level closer to the applicable rail.

In a variant of a basic charge transfer embodiment of the invention with dual nodes, a sensor includes control circuitry and a pixel having a photo site (110 of FIG. 1), a first storage node (120 of FIG. 1) and a second storage node (140 of FIG. 1). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (110) includes a photo detector (112) where the photo detector is either a photodiode or a pinned photodiode. The first and second collected signals are charge type signals where the signal value is encoded by the number of charge units regardless of the potential that represents. The first storage node (120) includes a first charge holding capacitor (122), a first charge transfer gate (124) coupled between the first charge holding capacitor and the photo detector, and a reset gate (128) coupled to the first charge holding capacitor (122), and the second storage node (140) includes a second charge holding capacitor (142), a second charge transfer gate (144) coupled between the second charge holding capacitor and the photo detector, and a reset gate (148) coupled to the second charge holding capacitor (142). In one variant, the first and second charge transfer gates are formed of NMOS technology, and the reset gates of the first and second storage nodes are formed of PMOS technology. In another variant, the first and second charge transfer gates are formed of PMOS technology, and the reset gates of the first and second storage nodes are formed of NMOS technology.

In another variant of a basic charge transfer embodiment of the invention with dual nodes, a sensor includes control circuitry and a pixel having a photo site (110 of FIG. 1), a first storage node (120 of FIG. 1), a second storage node (140 of FIG. 1), an output buffer (162), and a reset gate coupled to an input of the output buffer. As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (110) includes a photo detector (112) where the photo detector is either a photodiode or a pinned photodiode. The first and second collected signals are charge type signals where the signal value is encoded by the number of charge units regardless of the potential that represents. The first storage node (120) includes a first charge holding capacitor (122), a first charge transfer gate (124) coupled between the first charge holding capacitor and the photo detector, and an output voltage switch (126) coupled between the first charge holding capacitor and the output buffer, and the second storage node (140) includes a second charge holding capacitor (142), a second charge transfer gate (144) coupled between the second charge holding capacitor and the photo detector, and an output voltage switch (146) coupled between the second charge holding capacitor and the output buffer. In one variant, the reset gate coupled to an input of the output buffer is formed of PMOS technology, and the first and second charge transfer gates are formed of NMOS technology. In another variant, the reset gate coupled to an input of the output buffer is formed of NMOS technology, and the first and second charge transfer gates are formed of PMOS technology.

In another basic charge transfer embodiment of the invention with preset gate, a sensor includes control circuitry and a pixel having a photo site (110 of FIG. 1), a first storage node (120 of FIG. 1) and a second storage node (140 of FIG. 1). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (110) includes a photo detector (112) and a preset gate (116) coupled to the photo detector (112). The photo detector is either a photodiode or a pinned photodiode. The first and second collected signals are charge type signals where the signal value is encoded by the number of charge units regardless of the potential that represents. The control circuitry is coupled to the preset gate to provide the preset gate with a preset signal (VPR). The first storage node (120) includes a first charge holding capacitor (122) and a first charge transfer gate (124) coupled between the first charge holding capacitor and the photo detector, and the second storage node (140) includes a second charge holding capacitor (142) and a second charge transfer gate (144) coupled between the second charge holding capacitor and the photo detector. In one variant, the first and second charge transfer gates are formed of NMOS technology, and the preset gate is formed of PMOS technology. In another variant, the first and second charge transfer gates are formed of PMOS technology, and the preset gate is formed of NMOS technology.

In another basic voltage transfer embodiment of the invention with preset gate, a sensor includes control circuitry and a pixel having a photo site (210 of FIG. 2), a first storage node (220 of FIG. 2) and a second storage node (240 of FIG. 2). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (210) includes a photo detector (212) and a preset gate (216) coupled to the photo detector. The photo detector is either a photodiode or a pinned photodiode. The first and second collected signals are voltage type signals where the signal value is encoded in the voltage regardless of the number of charge units that represents on a particular capacitor. The control circuitry is coupled to the preset gate to provide the preset gate with a preset signal (VPR). In one variant, the preset gate is formed of NMOS technology, and the input buffer is formed of PMOS technology. In another variant, the preset gate is formed of PMOS technology, and the input buffer is formed of NMOS technology.

In another basic voltage transfer embodiment of the invention with an output buffer, a sensor includes control circuitry and a pixel having a photo site (210 of FIG. 2), a first storage node (220 of FIG. 2), a second storage node (240 of FIG. 2), and an output buffer (262). As will be appreciated from the disclosure herein, the control circuitry transfers a first collected signal from the photo site to the first storage node during a first period, transfers a second collected signal from the photo site to the second storage node during a second period that follows the first period, and then transfer the first and second collected signals out of the pixel during a third period that follows the second period. The photo site (210) includes a photo detector (212) where the photo detector is either a photodiode or a pinned photodiode. The first and second collected signals are voltage type signals where the signal value is encoded in the voltage regardless of the number of charge units that represents on a particular capacitor. The first storage node includes a first voltage sample holding capacitor (222) and an output voltage switch (226) coupled between the first voltage sample holding capacitor and the output buffer, and the second storage node includes a second voltage sample holding capacitor (242) and an output voltage switch (246) coupled between the second voltage sample holding capacitor and the output buffer. In one variant, the input buffer is formed of PMOS technology, and the output buffer is formed of NMOS technology. In another variant, the input buffer is formed of NMOS technology, and the output buffer is formed of PMOS technology.

Figure 5:
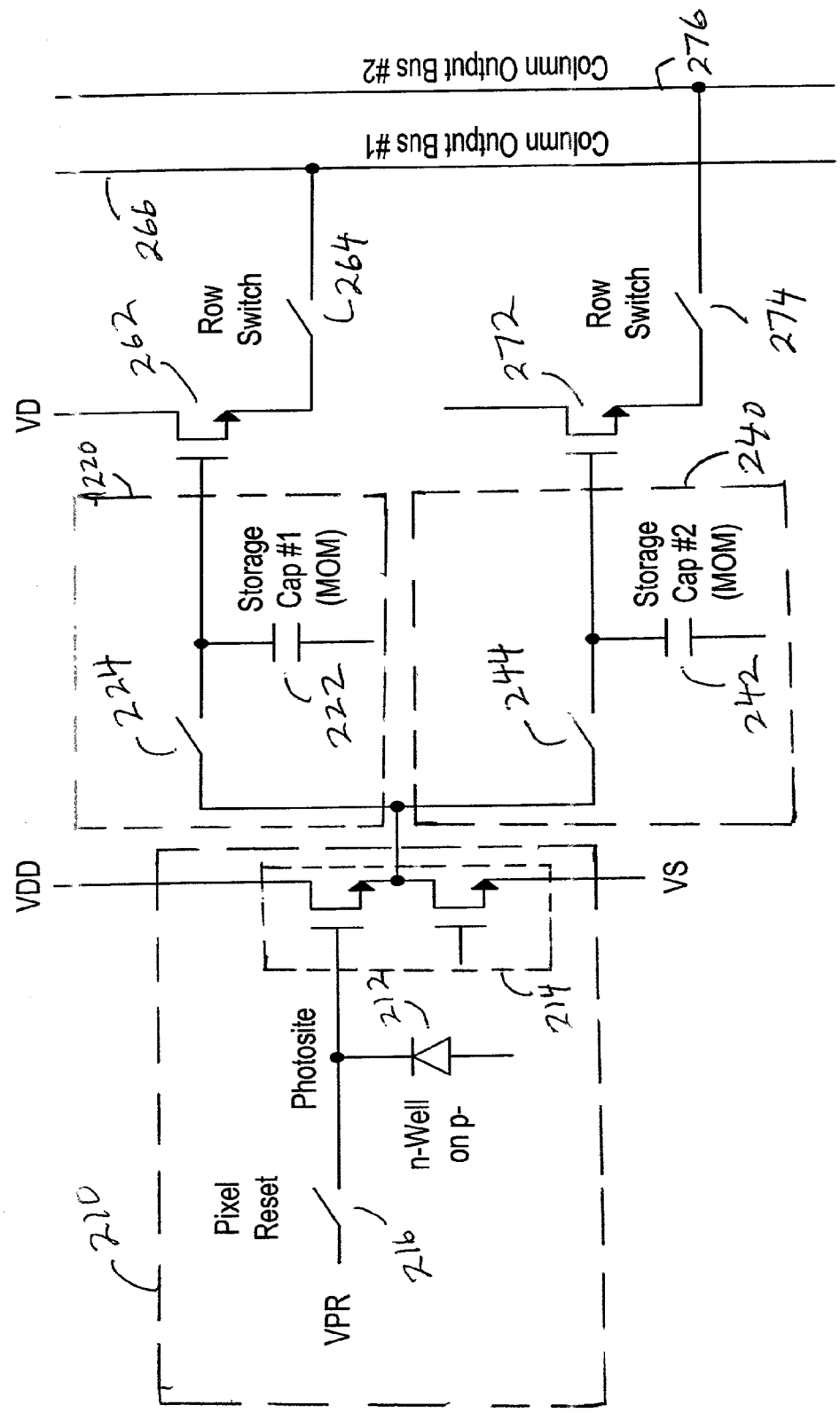

Another solution makes use of parasitic overlap capacitances to induce feedthroughs with a polarity that counteracts the VT drops within the pixel. This is a bootstrapping scheme. For example, the pixel in FIG. 5 is configured with an NMOS photosite buffer and two NMOS column buffers. During the storage of the signals on the storage nodes (Capacitor #1 and Capacitor #2) the bias VD is maintained at a low level. For readout, the bias VD is clocked high which turns on the column buffers. The low to high transition of the bias VD also causes the floating storage nodes to be pulled up due to parasitic overlap capacitance between the VD node and the gate node of each source-follower. This induces a positive offset on the storage nodes which reduces the size of the VT drop between the photosite and the storage nodes.

In another variant of the second embodiment of the invention with an output buffer bootstrap, in the sensor described above as a second embodiment, the pixel further includes an output buffer (262) that includes a source follower having drain and having a gate electrode as an input of the output buffer. The source follower is formed so that a parasitic capacitance exists between the drain and the gate electrode. The first storage node (220) includes a first voltage sample holding capacitor (222), an input voltage switch (224) coupled between the input buffer and the first voltage sample holding capacitor, and an output voltage switch (226) coupled between the first voltage sample holding capacitor and the output buffer. The second storage node (240) includes a second voltage sample holding capacitor (242), an input voltage switch (244) coupled between the input buffer and the second voltage sample holding capacitor, and an output voltage switch (246) coupled between the second voltage sample holding capacitor and the output buffer. The voltage switches are as previously described. The voltage sample holding capacitor is a capacitance, as operates over a sufficient voltage range to store the range of expected signal values. The control circuitry is coupled to the drain of the source to provide a drain voltage signal, and the control circuitry includes logic that can control the drain voltage signal to switch from one potential to another at a time of readout to induce a voltage through the parasitic capacitance that is additive to a signal voltage applied to the gate electrode at the time of readout. By proper adjustment of the voltage shift and the parasitic capacitance, the consequences of transistor threshold voltage VT drops can be compensated for.

Figure 6:
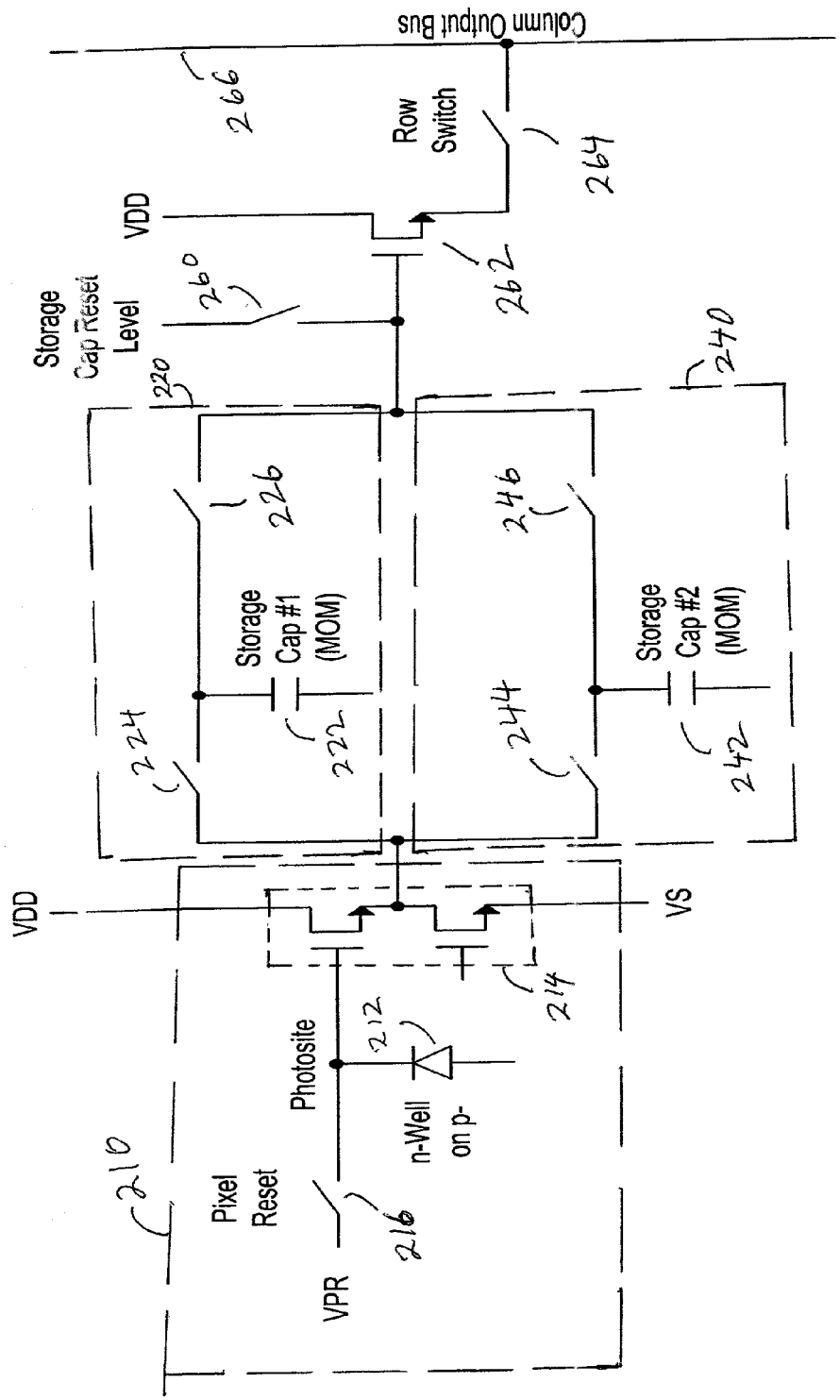

FIG. 5 illustrates an implementation of buffered photosite architecture. The complication with the use of the parasitic overlap capacitance scheme is that there will be mismatch between the parasitic overlap capacitances between two drain and storage nodes which will lead to slightly different offsets between the two outputs. This can be eliminated by instead using a single output column and single output buffer per pixel as illustrated in FIG. 6. As with the similar pixel implemented with photosite charge transfer, this pixel requires switches to connect the appropriate storage node to the output buffer, and an additional reset switch so that the input node of the column buffer can be reset. This implementation, of course, eliminates issues related to gain mismatch between the two column buffers. FIG. 6 illustrates an implementation of buffered photosite architecture with single output data column.

The photosite requires a distinct reset gate since there is no other way to remove the signal charge integrated from the photosite. If the photosite is a PPD, then the photosite is fully depleted of charge during charge transfer to a storage node thereby eliminating kTC noise. If the photosite is a conventional diode then the easiest reset scheme in terms of biasing and clocking is a soft one; however, a soft scheme will leave the pixel sensitive to lag and there will be a difference in the reset level from pixel to pixel. A hard reset scheme will eliminate lag and will eliminate pixel to pixel variations in the reset level.

For the charge transfer architecture it is most desirable to minimize the capacitance on the storage nodes since these nodes also double as the "sense node" on which the signal charge is converted to a signal voltage. Less capacitance translates to a high voltage swing for a given charge signal, and it also reduces reset noise (kTC). For the buffered photosite implementation, the storage capacitors are storing a signal encoded as a certain voltage rather than a signal encoded as a certain amount of charge and hence these capacitances should be maximized in order to minimize noise on the sampled voltage that is stored on them. Large capacitors can be implemented as large area diodes; however, these large area diodes will also act as sinks for charge photo generated beneath depletion region that lies beneath the photosite. When this charge ends up migrating into the storage diodes, it shows up in the signal as undesirable signal crosstalk. However, if the storage capacitors are implemented as poly-on-poly or metal-on-metal capacitors (common elements in analog processes) then the capacitances can be made large while still maintaining a minimum sized diode thereby reducing crosstalk.

In another embodiment of the invention with large storage capacitors, in the sensor described above as a second embodiment, the first storage node (220) includes a first voltage sample holding capacitor (222) and an input voltage switch (224) coupled between the input buffer and the first voltage sample holding capacitor. The second storage node (240) includes a second voltage sample holding capacitor (242) and an input voltage switch (244) coupled between the input buffer and the second voltage sample holding capacitor. The voltage switches are as previously described. The voltage sample holding capacitor is a capacitance, as described below, that holds a signal value encoded as a voltage, and the capacitor operates over a sufficient voltage range to store the range of expected signal values. The first voltage sample holding capacitor (222) is one of a poly-on-poly capacitor and a metal-on-metal capacitor, and the second voltage sample holding capacitor (242) is one of a poly-on-poly capacitor and a metal-on-metal capacitor.

Though not specific to the buffered photosite implementation, the internal pixel biases that run the in-pixel source-followers can be clocked so that they are operational only during the portions of the frame time that the source-followers need to be operational. For example, the bias voltage at the bottom of the photosite buffer would normally be ground, but it can be clocked to VDD (or simply left floating) in order to eliminate current flow during the readout of the storage nodes. In one scheme, the bootstrapping and power save functionalities can be combined such that the bias to the base of the photosite buffer and to the top of the column buffers is shared. The bias is low during the photosite read and high during the storage node read. As the bias clocks from low to high at the end of the photosite reads, then the stored voltages are increased.

In another embodiment of the invention with a power save feature, in the sensor described above as a second embodiment, the first storage node (220) includes a first voltage sample holding capacitor (222) and an input voltage switch (224) coupled between the input buffer and the first voltage sample holding capacitor. The second storage node (240) includes a second voltage sample holding capacitor (242) and an input voltage switch (244) coupled between the input buffer and the second voltage sample holding capacitor. The voltage switches are as previously described. The voltage sample holding capacitor is a capacitance, as described below, that holds a signal value encoded as a voltage, and the capacitor operates over a sufficient voltage range to store the range of expected signal values. The control circuitry is coupled to the input buffer (214) to provide a drain signal and a source signal, and the control circuitry clocks the drain and source signals to be operational only when charge in the photo detector (212) is read into one of the first voltage sample holding capacitor (222) and the second voltage sample holding capacitor (242).

In alternative embodiments of the invention, the invention is implemented with either the charge transfer or the buffered photosite architecture. The invention covers the mode of operation rather than to the specific architecture. In the invention the signal is stored on one storage site and the crosstalk signal equally stored on the two storage sites. Prior to the start of signal integration the signals on the two storage nodes are reset. The signal is then integrated on the photosite. At the end of the integration period it is transferred to the first storage node. The storage nodes are laid out symmetrically about the photosite. Thus, both nodes will have been collecting background crosstalk signal in roughly equal amounts during the integration and will continue to do so during the readout phase. The two nodes are read out and subtracted thereby subtracting the crosstalk signal. Note that charge or voltage is never explicitly transferred from the photosite to the second storage node. The second transfer gate (for the charge transfer architecture) or the second access switch (for the buffered photosite architecture) is maintained in the pixel to maximize the symmetry of the two nodes within the pixel.

In another embodiment of the invention with large storage capacitors, in the sensor described above as a second embodiment, the first storage node (220) includes a first voltage sample holding capacitor (222) and an input voltage switch (224) coupled between the input buffer and the first voltage sample holding capacitor. The second storage node (240) includes a second voltage sample holding capacitor (242) and an input voltage switch (244) coupled between the input buffer and the second voltage sample holding capacitor. The first and second voltage sample holding capacitors (222, 242) are disposed symmetrically about the photo detector (212). The voltage switches are as previously described. The voltage sample holding capacitor is a capacitance, as described below, that holds a signal value encoded as a voltage, and the capacitor operates over a sufficient voltage range to store the range of expected signal values.

In another embodiment of the invention, the invention relates to a dual-storage node pixel that reduces the time delay between exposures to 10 µs, freezing the background lighting. The sensor provides a difference image in a single frame readout. This particular pixel employs an in-pixel buffer to improve sensitivity which is preferable but not required.

Figure 7:
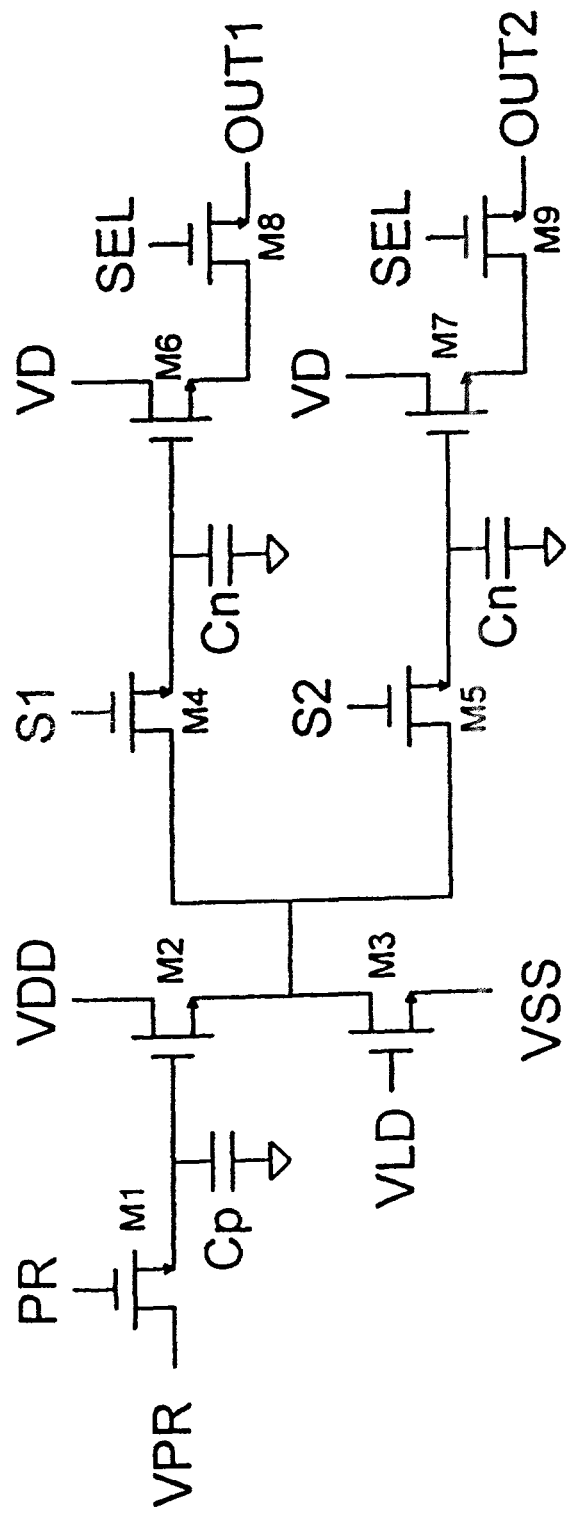

In the general embodiment, illustrated in FIG. 7, a pixel includes nine nFET transistors (M1-M9), one photosensitive capacitor (Cp), and two storage node capacitors (Cn) and is driven by nine electrical control signals (VPR, PR, VDD, VLD, VSS, S1, S2, VD, SEL) and provides two output signals (OUT1, OUT2).

The photosensitive capacitor Cp is any structure which can collect optically generated carriers. It may be an n+ photodiode, an n− photodiode, a photogate or a pinned-photodiode structure. Typically, it is the largest structure in the pixel to maximize the effective quantum efficiency. Control signals VPR and PR control the reset of Cp between exposures and provide antiblooming within an exposure. Control signals VDD (drain voltage), VLD (load voltage), VSS (source voltage) control the in-pixel buffer. Control signals S1 and S2 control the sampling of the buffer output onto the two storage nodes. The storage nodes Cn hold the sampled signal for the duration of the frame readout. The control signals VD and SEL control the column amplifiers. Typically, the column amplifiers are source-follower configurations where VD is connected to the upper supply bias. A differential amplifier configuration is also possible by connecting VD at transistors M6 and M7 to a current source. The two column output busses OUT1 and OUT2 transmit the pixel output signals to the remaining analog chain outside the pixel array.

In operation, an image capture cycle includes the following time intervals:

$t_{RESET1}$ control signals initiate the reset of all nodes in the pixel;

$t_{INT1}$ a PR low transition initiates the first integration period;

$t_{S1}$ a S1 low transition completes sample and hold operation of buffered output by first storage node;

$t_{RESET2}$ reset the pixel and second storage node prior to second integration;

$t_{INT2}$ a PR low transition initiates the second integration period;

$t_{S2}$ an S2 low transition completes sample and hold operation of buffered output by second storage node; and $t_{READ}$ a SEL high transition places the pixel outputs on OUT1 and OUT2

In general, the pixel will be implemented with a reduced set of control busses. This simplifies control and improves a quantum efficiency. The choice of reduced control bussing is dictated by the CMOS process properties (number of metal layers, pinned-photodiode, threshold voltages, transistor characteristics), power requirements, or interface requirements to remaining CMOS circuitry.

The following is not meant to be inclusive but shows some of the basic alternative configurations and embodiments.

Figure 8:
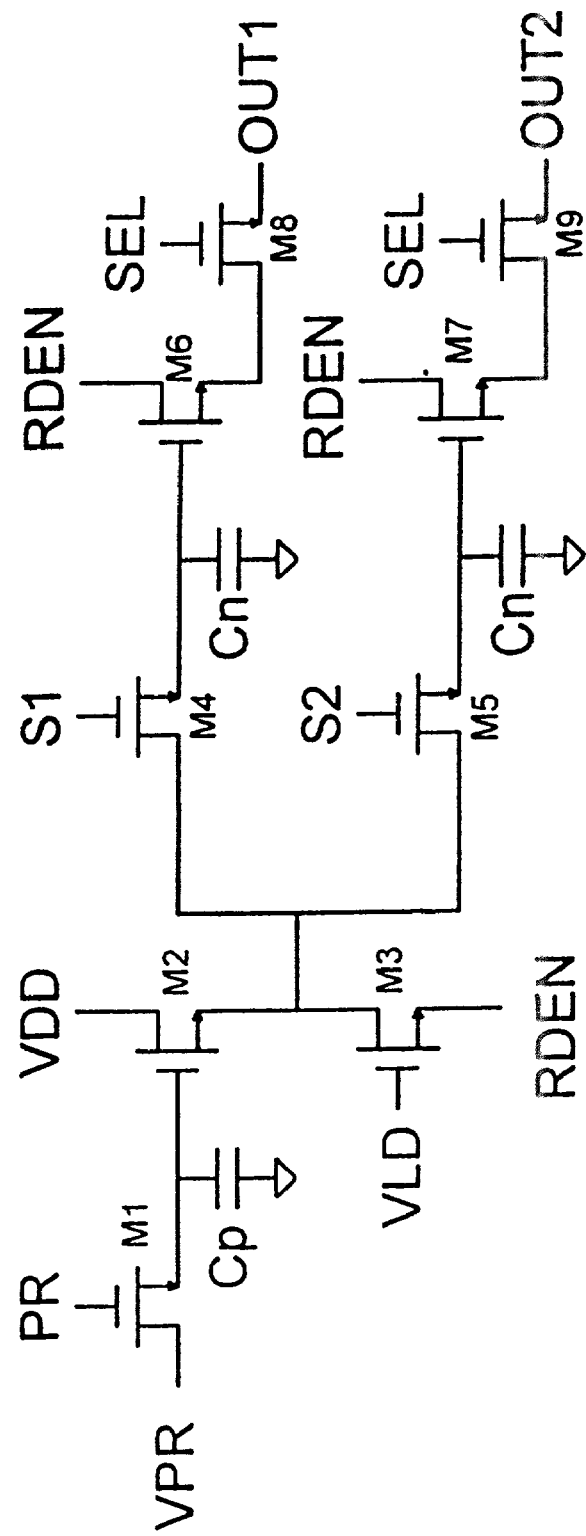

In FIG. 8, a pixel with eight control busses and with storage node boot strapping is depicted. In this implementation, RDEN is clocked low during pixel reset and integration and then clocked high during readout.

Figure 9:
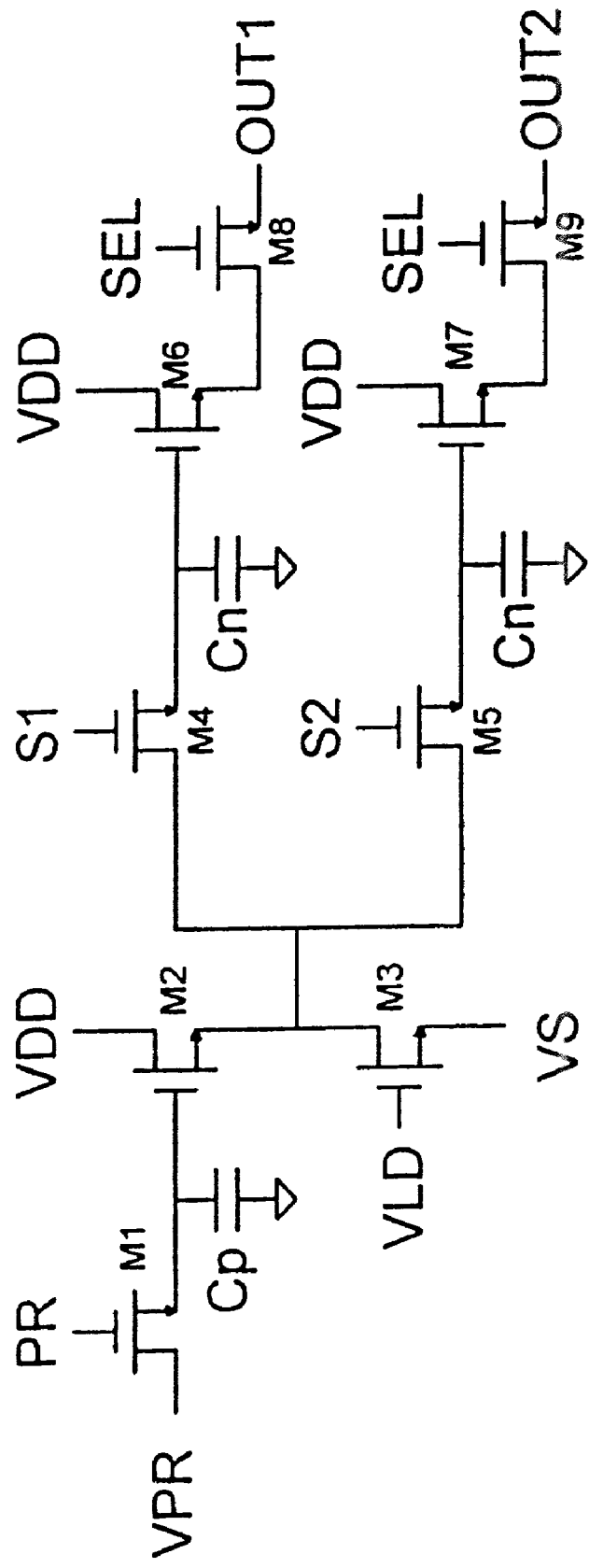

In FIG. 9, a pixel with eight control busses is also depicted. However, in this implementation there is no bootstrap of the storage nodes; however, the pixel could be bootstrapped if VDD is clocked. VLD or VS may be clocked to enable the buffer only during the integration periods.

Figure 10:
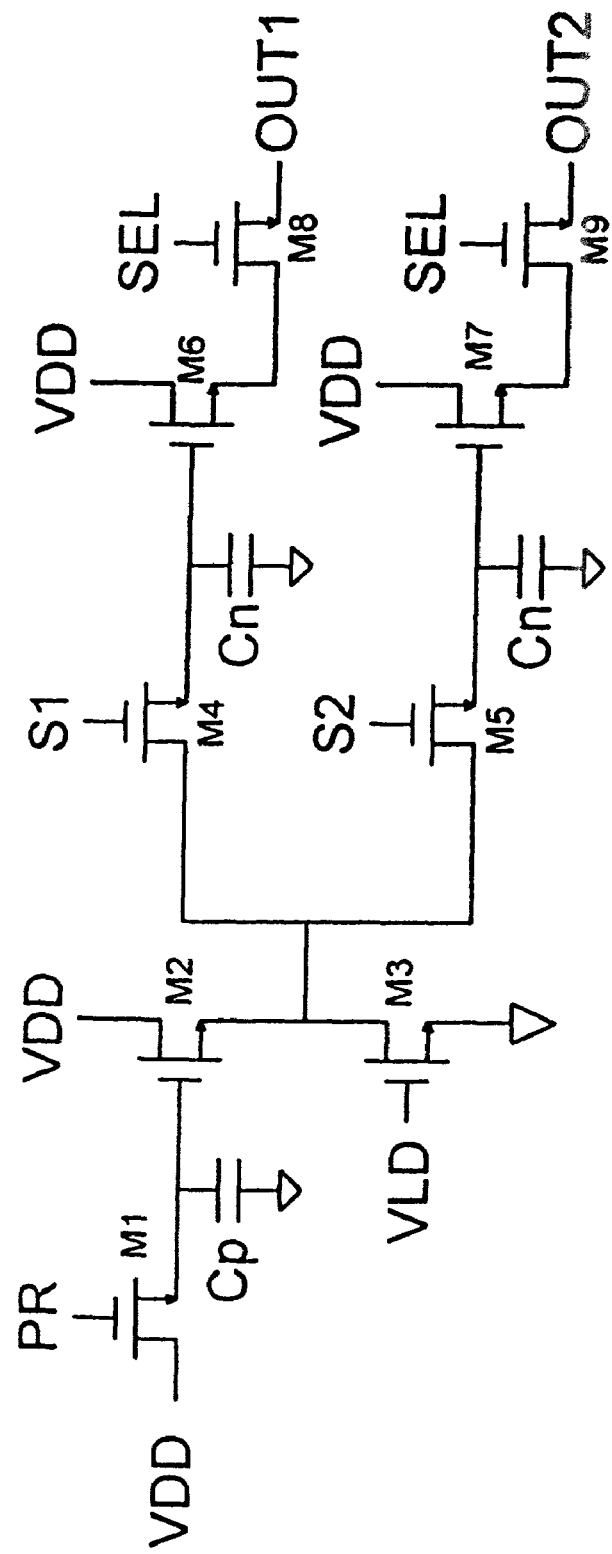
Figure 41:
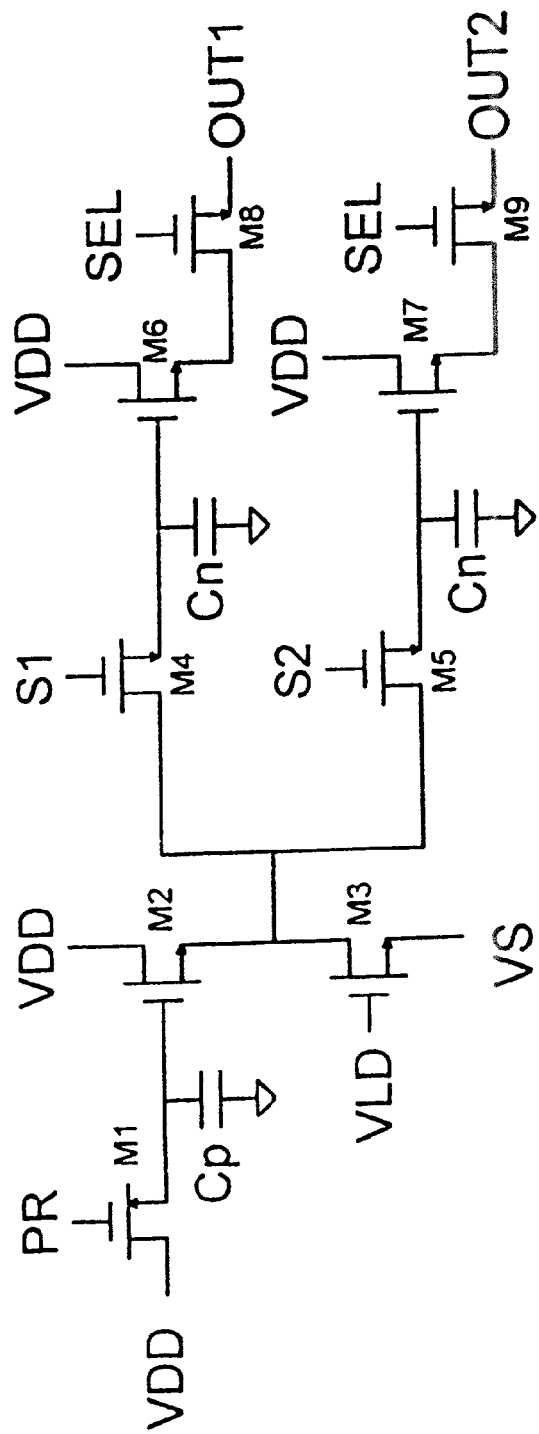

In FIG. 10, a pixel with seven control busses is depicted. This implementation uses the VDD control signal in several places and employs a substrate connection in the buffer to eliminate one control bus.

In FIG. 11, a pixel with a pFET used for pixel reset is depicted. Replacing M1 with a pFET allows the pixel to be reset to the maximum voltage (able to accumulate a maximum number of photo electrons, of a negative charge).

A single storage node pixel is a trivial extension. This would eliminate three transistors, one control bus (S2) and one output bus (OUT2). A multi-storage node (n>2) pixel is also a trivial extension. Three transistors, one control bus and one output bus would be added for each extra storage node.

Figure 12:
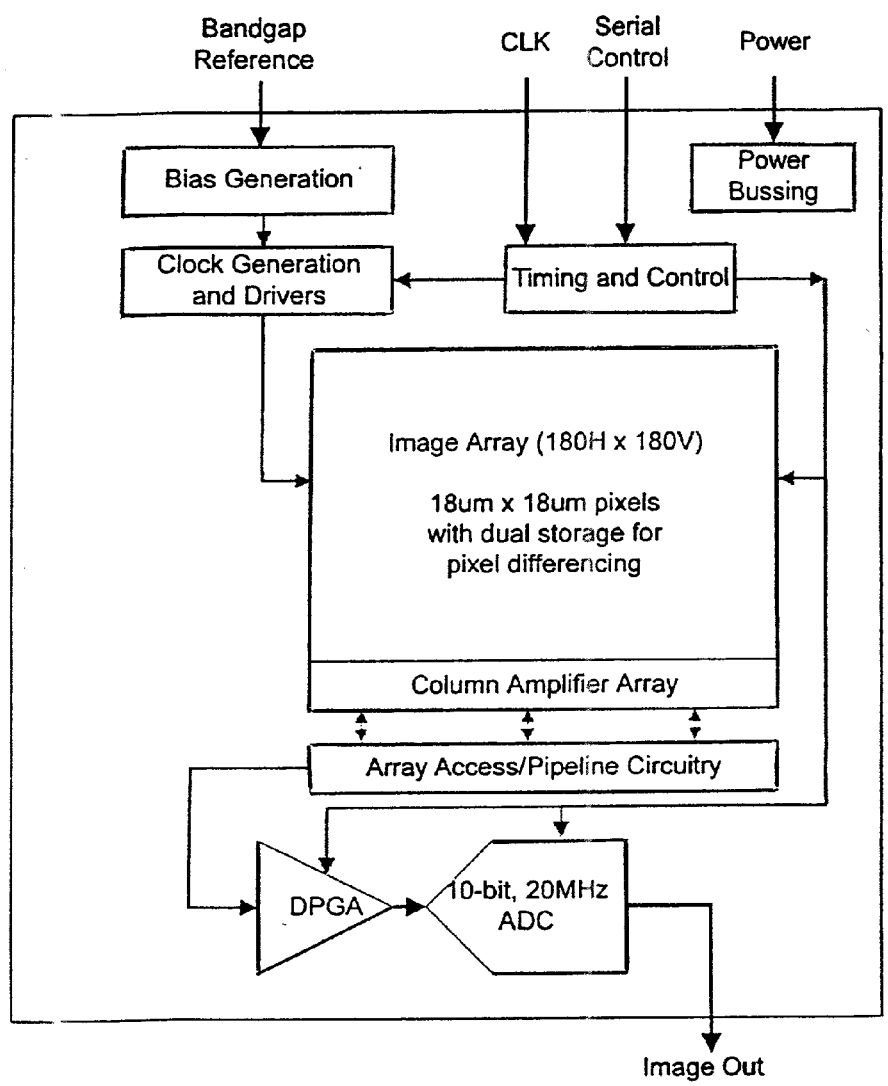
FIG. 12 is a block diagram of a sensor according to the present invention.

This invention relates to a CMOS image sensor with a specialized pixel to allow two images to be captured substantially contemporaneously and subsequently read out. FIG. 12 shows the present configuration of a prototype image sensor. The image sensor of FIG. 12 only generates the difference image as the intended application is background subtraction. Without loss of generality, it is possible to modify the analog chain to deliver both images to the output.

FIG. 12 is a block diagram of a CMOS image sensor employing a dual storage node pixel. Other aspects of the design include the analog chain and background subtraction. The entire analog chain (pixel, column amplifiers, pipeline, DPGA, ADC) is fully differential. Known CMOS sensors employ single-ended analog chains. The sensor is applicable for background subtraction of rapidly changing scenes. This invention applies to any CMOS sensor with in-pixel storage used for the purpose of background subtraction of fast moving scenes or even for the specific application of background subtraction for smart air-bag deployment.

A dual storage node architecture for a CCD sensor is described in U.S. Pat. No. 5,585,652 to S. Kamasz, et al., "Method and apparatus for real-time background illumination subtraction", incorporated herein by reference. This patent reference utilizes some unique properties of CCDs. In contrast, the present invention utilizes either CMOS sensor architecture or on chip differential amplifiers.

A photo detector node of a pinned photo diode is preferred for best sensitivity. A single supply bus for pixel reset bias (VPR), buffer bias (VDD) and column amplifier (RDEN, read enable) is preferred for an improved fill factor. The buffer can be either continuously activated (more power dissipation) or enabled by clocking the load FET gate (greater capacitance than clocking the source).

This invention is particularly useful for background subtraction of rapidly changing scenes. The difference in time between the signal image and the background image is in the order of 10 microseconds. In known techniques, it is necessary to read out an entire image (the signal image) before the next image (background image) can be collected. This process requires a millisecond or more in known sensors (even with high frame rates). The signal node pixels of known sensors have a greater delay between images (approximately 50×) compared to the short delay between images achievable by the present invention.

It will be appreciated by persons of ordinary skill in the this art in light of these teachings that control circuitry as used herein includes logic elements, memory elements, level shifter elements and drivers needed to implement the various timing and control functions needed to make a sensor work. Such elements may be made of CMOS (complimentary MOS), PMOS (P channel MOS), or NMOS(N channel MOS) circuits, but may also include bipolar technology particularly as used in bimos circuits. Bimos circuits are to be understood to include a combined MOS transistor and bipolar transistor to provide enhanced drive capability. Such control circuitry may be micro programmed controlled by memory elements (e.g., a read only memory) or by ASIC circuits (application specific integrated circuits) or discrete timing and control circuits.

Having described preferred embodiments of a novel dual storage node pixel for a CMOS sensor (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A sensor comprising:

a pixel that includes a first storage node, a second storage node and a photo detector that is one of a photodiode and a pinned photodiode; and control circuitry to transfer a first collected signal from the photo detector to the first storage node during a first period, to transfer a second collected signal from the photo detector to the second storage node during a second period, and to transfer the first and second collected signals out of the pixel during a third period that follows the second period, wherein the first storage node includes a first charge holding capacitor, a first charge transfer gate, and a first reset gate coupled to the first charge holding capacitor, the first charge transfer gate being coupled between the first charge holding capacitor and the photo detector, wherein the second storage node includes a second charge holding capacitor, a second charge transfer gate and a second reset gate coupled to the second charge holding capacitor, the second charge transfer gate being coupled between the second charge holding capacitor and the photo detector, wherein the first reset gate is coupled between the first charge holding capacitor and a first reset signal, wherein the control circuitry is coupled to the first reset gate of the first storage node to provide a first reset gate control signal, and wherein the control circuitry controls a potential of the first reset signal to be less than a potential of the first reset gate control signal minus a transistor threshold voltage.

2. The sensor of claim 1, wherein the potential of the first reset gate control signal differs from the potential of the first reset signal by the transistor threshold voltage.

3. A sensor comprising:

a pixel that includes an output buffer, a first storage node, a second storage node and a photo detector that is one of a photodiode and a pinned photodiode; and control circuitry to transfer a first collected signal from the photo detector to the first storage node during a first period, to transfer a second collected signal from the photo detector to the second storage node during a second period, and to transfer the first and second collected signals out of the pixel during a third period that follows the second period, wherein the first storage node includes a first charge holding capacitor and an output voltage switch coupled between the first charge holding capacitor and the output buffer, wherein the second storage node includes a second charge holding capacitor and an output voltage switch coupled between the second charge holding capacitor and the output buffer, wherein the reset gate is coupled between the input of the output buffer and a reset signal, wherein the control circuitry is coupled to the reset gate to provide a reset gate control signal, and wherein the control circuitry controls a potential of the reset signal to be less than a potential of the reset gate control signal minus a threshold voltage.

4. The sensor of claim 3, wherein the potential of the reset gate control signal differs from the potential of the reset signal by a transistor threshold voltage.

* * * * *